G. C. CROSS.
TIRE PROTECTOR.
APPLICATION FILED FEB. 21, 1911.

1,009,051.

Patented Nov. 21, 1911.

Inventor
George C. Cross

Witnesses
Edwin G. McKee
V. B. Hillyard.

By Victor J. Evans
Attorney

UNITED STATES PATENT OFFICE.

GEORGE C. CROSS, OF CHATTANOOGA, TENNESSEE.

TIRE-PROTECTOR.

1,009,051. Specification of Letters Patent. Patented Nov. 21, 1911.

Application filed February 21, 1911. Serial No. 609,954.

*To all whom it may concern:*

Be it known that I, GEORGE C. CROSS, a citizen of the United States, residing at Chattanooga, in the county of Hamilton and State of Tennessee, have invented new and useful Improvements in Tire-Protectors, of which the following is a specification.

The invention provides protective means for resilient tires to increase the life thereof, diminish the chances of casualties incident to skidding and to increase the tractive force so as to prevent slipping on smooth surfaces or soft and sandy roads.

The protector comprises a series of plates or scales arranged to encircle the tread portion of the tire and novel connecting means for joining the plates or scales and at the same time serving to connect the same to side binders, the plates or scales being reinforced on their outer surfaces by means of wear plates riveted or otherwise secured thereto so as to be readily replaced when worn.

The invention consists of the novel features, details of construction and combination of parts, which hereinafter will be more particularly set forth, illustrated in the accompanying drawings, and pointed out in the appended claims.

Figure 1:
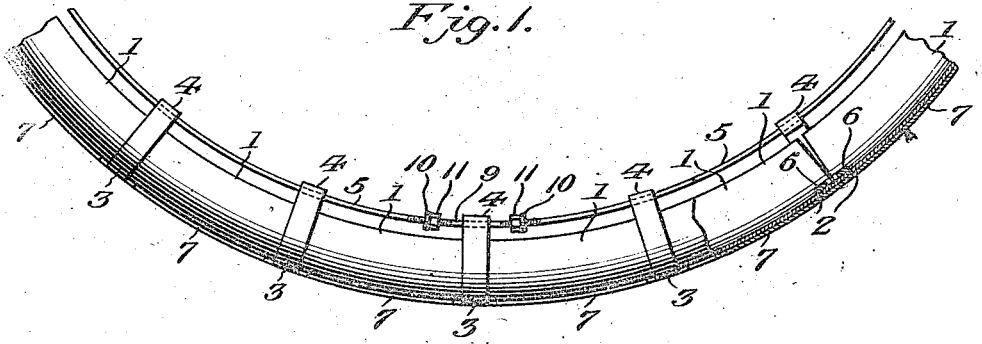
Figure 2:
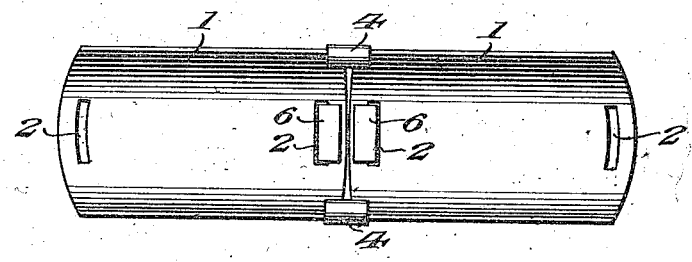
Figure 3:
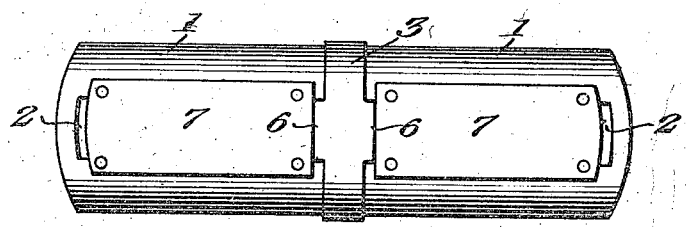
Figure 4:
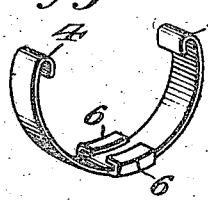
Figure 5:

Referring to the drawings, forming a part of the application, Figure 1 is a side view of a length of protector embodying the invention, a portion being in longitudinal section. Fig. 2 is a plan view of a part of the protector as seen from the inner side. Fig. 3 is a plan view of part of the protector as seen from the tread side. Fig. 4 is a perspective view of one of the joint strips. Fig. 5 is a detail view of the connector for coupling the ends of a side binding wire.

Corresponding and like parts are referred to in the following description, and indicated in all the views of the drawings, by the same reference characters.

The protector or armor comprises a series of plates or scales 1 preferably formed of sheet steel, said plates being curved longitudinally and transversely to conform to the circumferential and transverse curvature of the tire for which the protector is designed. Transverse slots 2 are formed in the plates or scales 1 near their ends and at a central point and receive the hooks or lips on the joint strips, by means of which the plates are coupled. The plates or scales 1, when assembled, have their ends approaching so closely as to practically encircle the tread portion of the tire. In order that the plates may have a limited play without binding, the ends of adjacent plates are spaced, the spaces gradually increasing in width from the middle point toward opposite longitudinal edge portions of the protector. The plates or scales may be stamped or pressed into required form and will vary in size according to the size of the tire for which the protector is intended.

Joint strips 3 overlap the joints formed between the plates or scales and are of a length to project a short distance beyond the longitudinal edges of the protector, the projecting ends being bent into hooks 4 engaging over binders 5 arranged upon opposite sides of the tire. The hooks 4 face inward, thereby preventing accidental disengagement from the binders 5 and also preventing their catching objects. Lips 6 are formed upon opposite sides of the joint strips 3 intermediate of their ends and these lips pass through transverse slots 2 of adjacent plates and are bent or clenched upon the inner sides of said plates, thereby serving to connect the same. The strips 3, it will be observed, prevent dirt and foreign matter from passing through the spaces formed between the ends of the plates and at the same time prevent the extremities of the plates from being bent outward or inward by coming in contact with stones or other objects.

Wear plates 7 are secured to the outer sides of the plates or scales 1 and reinforce the same and sustain the wear. The plates 7 are of a thickness corresponding to the thickness of the joint strips 3 so as to insure the formation of a practically continuous tread surface. The projecting parts presented by the wear plates and joint strips serve to prevent skidding or slipping and also to increase the traction between the tire and the surface. The wear plates 7 may be riveted to the plates or scales 1 or secured thereto in any manner.

The side binders 5 consist of stout wires and are engaged by the hooks 4 of the joint strips. The end portions of the binding wires are threaded and are coupled by means of a connector 9 which is formed of stout wire having terminal eyes 10 formed by coiling end portions of the wire upon itself, said eyes receiving the threaded ends of the binder, and nuts 11 being mounted upon the threaded ends of the binders and engaging said eyes 10, as indicated most clearly in Fig. 1.

Having thus described the invention, what I claim as new is:—

1. A protector for resilient tires comprising a series of plates having openings in their opposite ends, transverse joint strips overlapping the joints formed between the ends of the plates and having lips intermediate of their ends engaging the openings near the ends of the plates, said joint strips having their end portions projecting beyond the longitudinal edges of the protector and formed into hooks, and side binders engaging the hooked ends of the joint strips.

2. A protector for resilient tires comprising a series of plates having transverse slots near their extremities and midway of their longitudinal edges, transverse joint strips overlapping the joints formed between the plates and having lips intermediate of their ends passing through the transverse slots and having their end portions extended beyond the edges of the protector and formed into hooks, side binders engaging the hooked ends of the joint strips, and wear plates secured to the outer sides of the plates and of a thickness approximating the thickness of the joint strips.

In testimony whereof I affix my signature in presence of two witnesses.

GEORGE C. CROSS.

Witnesses:
V. B. HILLYARD,
BENNETT S. JONES.